(12) United States Patent
Eberle et al.

(10) Patent No.: US 11,353,010 B2
(45) Date of Patent: Jun. 7, 2022

(54) AXIAL PISTON MACHINE HAVING INTEGRAL COUNTING PERFORATION

(71) Applicant: Robert Bosch GmbH, Stuttgart (DE)

(72) Inventors: Christian Eberle, Lonsee (DE); Thomas Abenstein, Buch (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 16/751,987

(22) Filed: Jan. 24, 2020

(65) Prior Publication Data
US 2020/0272879 A1   Aug. 27, 2020

(30) Foreign Application Priority Data

Feb. 25, 2019   (DE) .................... 10 2019 202 483.1

(51) Int. Cl.
| | |
|---|---|
| *F04B 1/2035* | (2020.01) |
| *F01B 3/00* | (2006.01) |
| *F01B 31/12* | (2006.01) |
| *F04B 1/24* | (2006.01) |
| *F04B 1/2014* | (2020.01) |

(Continued)

(52) U.S. Cl.
CPC .......... *F04B 1/2035* (2013.01); *F01B 3/0032* (2013.01); *F01B 31/12* (2013.01); *F03C 1/0644* (2013.01); *F04B 1/122* (2013.01); *F04B 1/2014* (2013.01); *F04B 1/24* (2013.01); *G06M 1/27* (2013.01); *F04B 2201/1201* (2013.01)

(58) Field of Classification Search
CPC ...... F01B 3/0032; F01B 3/0044; F01B 31/12; F03C 1/0644; F04B 2201/1201; F04B 2201/1206; F04B 1/24; F04B 1/122; F04B 1/2014; F04B 1/2035; G06M 1/27; B60B 2310/232; B60B 2310/228; B60B 21/00; B60B 27/00; B23C 3/34; B23C 3/28

See application file for complete search history.

(56) References Cited

U.S. PATENT DOCUMENTS

| | | | |
|---|---|---|---|
| 4,795,278 A  * | 1/1989 | Hayashi | ............. B60B 27/0068  310/155 |
| 6,779,433 B2 * | 8/2004 | Brosch | .................... F04B 1/126  92/5 R |
| 2017/0276055 A1* | 9/2017 | Nabata | ...................... F04B 1/24 |

FOREIGN PATENT DOCUMENTS

| | | |
|---|---|---|
| DE | 195 13 669 A1 | 12/1995 |
| DE | 10 2012 016 069 A1 | 2/2014 |

(Continued)

*Primary Examiner* — Kenneth J Hansen
(74) *Attorney, Agent, or Firm* — Maginot, Moore & Beck LLP

(57) ABSTRACT

An inclined-axis axial piston machine includes a housing, a drive shaft and a cylinder barrel. The drive shaft is mounted in the housing so as to be rotatable with respect to a first axis of rotation and is integral with a flange. Each piston is coupled to the flange via a ball joint. A multiplicity of counting perforations are arranged in a periodically distributed and continuous manner over an outer circumferential surface of the flange. The housing accommodates a sensor arranged opposite the counting perforations such that rotation of the drive shaft causes a signal change at the sensor. Each counting perforation is formed integrally from the flange, in the form of a recess having a single continuous perimeter. A side wall of the recess, starting from the perimeter, extends uninterruptedly, without sharp bends or offsets, over the entire circumference of the perimeter.

13 Claims, 2 Drawing Sheets

(51) Int. Cl.
*F04B 1/122* (2020.01)
*F03C 1/06* (2006.01)
*G06M 1/27* (2006.01)

(56) References Cited

FOREIGN PATENT DOCUMENTS

| | | | |
|---|---|---|---|
| JP | 2002-267679 | A | 9/2002 |
| JP | 11 2008 003 624 | T5 | 11/2010 |

* cited by examiner

AXIAL PISTON MACHINE HAVING INTEGRAL COUNTING PERFORATION This application claims priority under 35 U.S.C. § 119 to patent application no. DE 10 2019 202 483.1, filed on Feb. 25, 2019 in Germany, the disclosure of which is incorporated herein by reference in its entirety.

The disclosure relates to an axial piston machine.

BACKGROUND

An axial piston machine of inclined-axis design is known from the DE 10 2012 016 069 A1. The corresponding drive shaft has a flange that, on its outer circumferential surface, is provided with an integral counting toothing. This is read by a sensor, in order to determine the rotational speed of the drive shaft.

A further axial piston machine of an inclined-axis design is known from DE 195 13 669 A1. Provided in that case is a separate ring, having rectangular openings, which has the same function as the aforementioned counting toothing.

SUMMARY

An advantage of the present disclosure consists in that the counting perforation can be produced particularly cost-effectively by the milling method, in particular by means of a end mill. The milling operation in this case is preferably CNC-controlled. The shape of the counting perforation according to the disclosure in this case has the particular advantage that, following the automated milling operation, there are no burrs on the counting perforations that would have to be subsequently removed. This could be done laboriously and precisely by hand, or less precisely, by means of an automated brushing process.

According to the disclosure, it is proposed that each counting perforation be formed integrally from the flange, in the form of a recess, the recess having a single continuous perimeter without sharp bends, a side wall of the recess, starting from the perimeter, extending uninterruptedly and without sharp bends over the entire circumference of the perimeter. The side wall can thus be produced by means of a end mill, with no risk of burrs at the perimeter. The outer circumferential surface, away from the counting perforations, is preferably rotationally symmetrical with respect to the first axis of rotation.

It may be provided that the counting perforations are identical to each other. The counting perforations are preferably arranged along a plane that is oriented perpendicularly in relation to the first axis of rotation. The corresponding sensor signal can thus be evaluated particularly easily.

It may be provided that the counting perforations are realized as elongate holes. This makes them particularly easy to produce by means of an end mill.

It may be provided that the counting perforations have a constant width and/or a constant depth. The direction in which the said depth is measured preferably extends in a plane that includes the first axis of rotation, perpendicular to the outer circumferential surface. The direction in which the said width extends preferably extends in a plane that is oriented perpendicularly in relation to the first axis of rotation, and oriented parallel, or tangentially, in relation to the outer circumferential surface.

It may be provided that the recess has a bottom surface that is flat in sections, the corresponding sections being arranged in an inclined manner relative to each other. The bottom surface can thus be produced particularly easily by means of an end mill. Milling of the recess makes it possible to avoid a drilling operation that involves burr formation. The flat sections are preferably each arranged perpendicularly in relation to a plane that includes the first axis of rotation.

It may be provided that the floor surface has two flat sections that are inclined in relation to each other at an angle other than zero, directly adjacent to each other. The counting perforation can thus be produced by means of two milling cuts, from the centre of the recess. Drilling of the end mill, which could produce burrs, is not necessary. The corresponding boundary line between the two sections is preferably realized as a straight edge. The boundary line of the recess preferably has a sharp bend solely in the region in which the two sections of the bottom surface are directly adjacent to each other.

It may be provided that the flat sections of the bottom surface are inclined in relation to each other such that, overall, a convex floor surface is obtained. This results in the recess being particularly easily accessible for the milling operation.

It may be provided that a section of the outer circumferential surface that is circular-cylindrical or circular-conical with respect to the first axis of rotation is assigned to each flat section of the bottom surface, each flat section of the bottom surface being arranged parallel to the assigned section of the outer circumferential surface. In each stage of the milling operation, therefore, the axis of rotation of the end mill can be aligned perpendicularly in relation to the cut region of the outer circumferential surface, such that there is no risk of burr formation. Furthermore, the drive shaft designed in this way can also be used in a variety of axial piston machines that differ in respect of the alignment of the sensor. In particular, the sensor can be aligned perpendicularly in relation to a respectively assigned section of the outer circumferential surface.

It may be provided that the perimeter is realized in the form of a sharp edge. Such a perimeter can be produced, by means of an end mill, without further reworking.

It may be provided that the perimeter is chamfered or rounded. The risk of injury during the assembly or repair of the axial piston machine can thereby be minimized. In particular, chamfering is particularly preferred, as it can be performed in an automated manner by means of a milling cutter. In this case, any burrs that are present on the continuous perimeter are removed in an automated manner.

It may be provided that a first and a second section of the side wall are parallel to each other and parallel to a plane that includes the first axis of rotation. The first and the second section can thus be produced simultaneously during a milling cut.

It may be provided that a third and a fourth section of the side wall are each realized in the form of half of a circular cylinder, the central axis of which intersects the first axis of rotation, the first, the second, the third and the fourth section of the side wall being realized such that, taken together, they form a continuous side wall without sharp bends or offsets.

It is understood that the features cited above and those yet to be explained in the following are applicable, not only in the respectively specified combination, but also in other combinations or singly, without departure from the scope of the present disclosure.

BRIEF DESCRIPTION OF THE DRAWINGS

The disclosure is explained in greater detail in the following on the basis of the appended drawings. There are shown.

DETAILED DESCRIPTION

Figure 1:
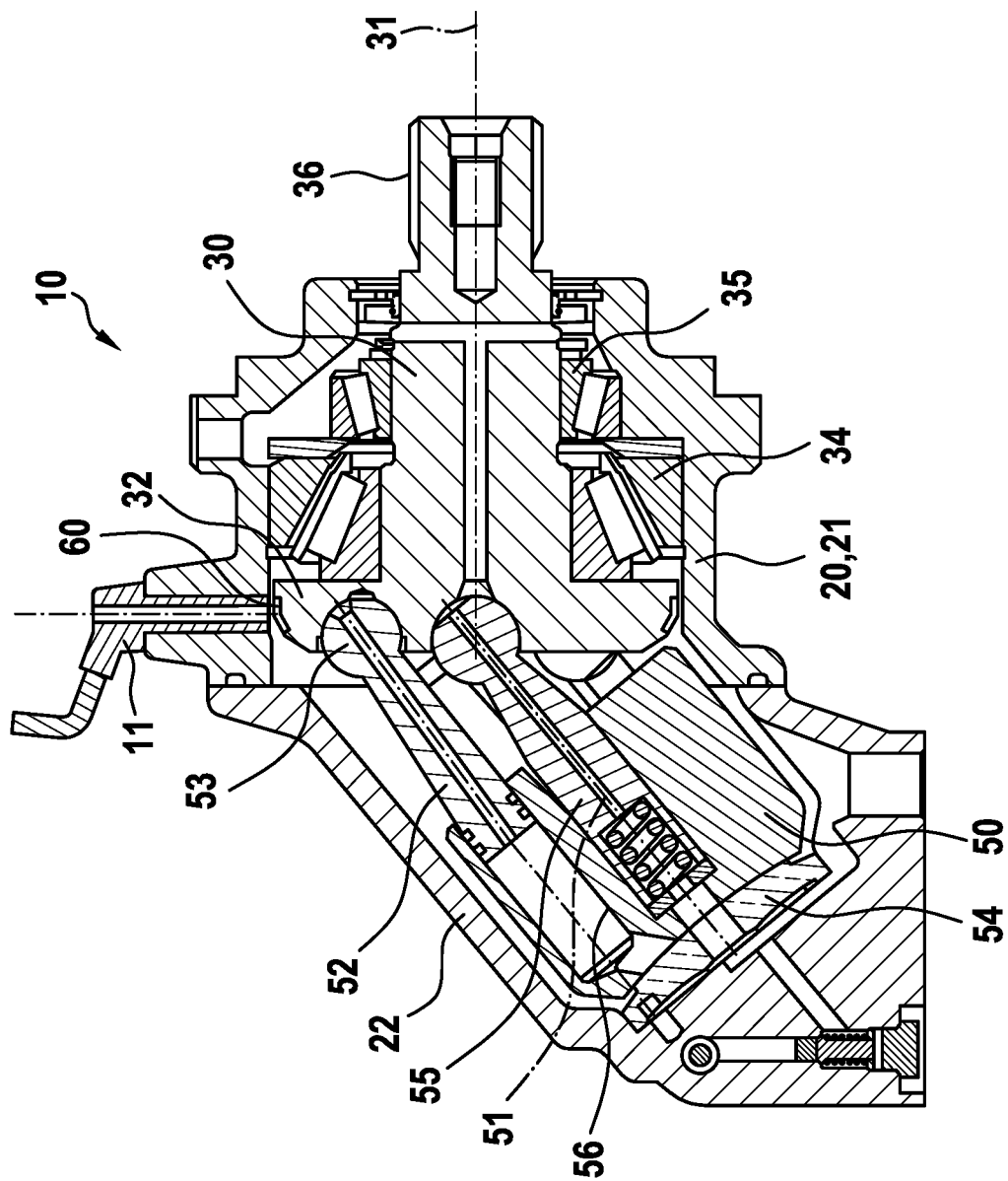
FIG. 1 a cross section of an axial piston machine according to the disclosure.

FIG. 1 shows a cross section of an axial piston machine 10 according to the disclosure. The axial piston machine 10 has a housing 20, which is composed of a first and a second housing part 21; 22. The two housing parts 21; 22 are each of a pot-type design, and are assembled on their open side, such that they surround a closed interior.

A drive shaft 30 is mounted in the first housing part 21 so as to be rotatable with respect to a first axis of rotation 31. Provided for this purpose are a first and a second rotary bearing 34; 35, which in the present case are realized as tapered roller bearings. The second housing part 22 accommodates a cylinder barrel 50 that is rotatable with respect to a second axis of rotation 51. The second axis of rotation 51 intersects the first axis of rotation 31 at an angle other than zero. In the present case, the position of the second axis of rotation 51 is predetermined by a spherical surface on the domed control plate 54 and on the centering piston 55, which engages in the cylinder barrel 50. However, this arrangement can also be used for axial piston machines in which the position of the second axis of rotation 51 is continuously adjustable.

Accommodated in the cylinder barrel 50 are a plurality of pistons 52, which are movable longitudinally in the direction of the second axis of rotation 51, and which are each coupled, via a ball joint 53, to a flange 32 on the drive shaft 30. When the drive shaft 30 is made to rotate, the pistons 52 execute a reciprocating motion in their respectively assigned cylinder bore 56 in the cylinder barrel 50.

The flange 32 is integral with the rest of the drive shaft 30, and is arranged at the end of the drive shaft 30 that faces toward the cylinder barrel 50. Its outer circumferential surface 33, away from the counting perforations 60, is rotationally symmetrical with respect to the first axis of rotation 31. It is composed, in particular, of a circular-cylindrical section and a plurality of circular-conical sections.

A sensor 11 is fixedly mounted in the housing 20. The sensor 11 preferably operates inductively, the drive shaft 30, with the counting perforations 60, preferably being composed of steel. The sensor 11 is opposite the counting perforations 60, separated by a small distance, such that the counting perforations moving past the sensor 11 cause a signal change at the sensor 11, from which the rotational speed, or rotary position, of the drive shaft 30 can be determined.

The drive shaft 30 protrudes from the housing 20 with a drive pin 36, via which it can be brought into rotary drive connection with a drive motor or with a device to be driven. This axial piston machine is preferably operated as a hydraulic motor.

Figure 2:
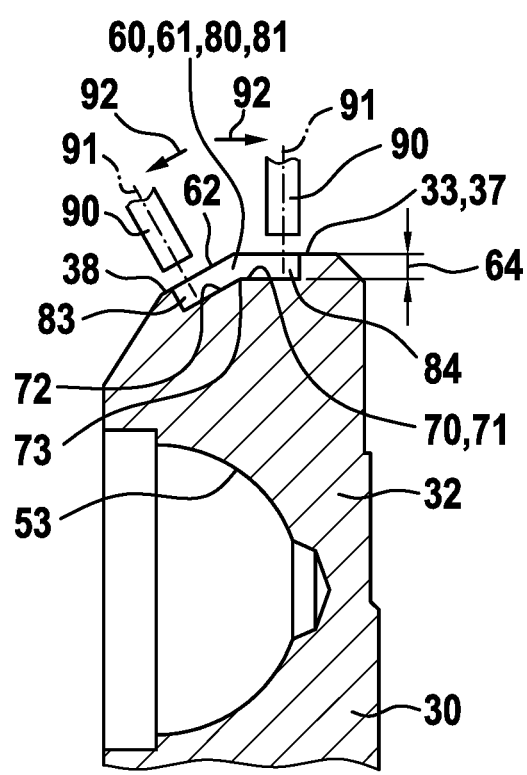
FIG. 2 a partial cross section of the flange of the axial piston machine according to FIG. 1.

FIG. 2 shows a partial cross section of the flange 32 of the axial piston machine 10 according to FIG. 2. It shows the spherical cap of the ball joint 53, into which the ball on the piston is mounted.

The outer circumferential surface 33 of the flange 32 has a first section 37, which is realized in the form of a circular cylinder with respect to the first axis of rotation (number 31 in FIG. 1). Directly adjacent to the first section 37 is a second section 38, which is realized in the form of a circular cone with respect to the first axis of rotation 31.

Each individual counting perforation 60 is realized as a recess 61, which is preferably produced by means of an end mill 90. The axis of rotation 91 of the end mill 90 in this case runs in a plane that includes the first axis of rotation, and is aligned perpendicularly in relation to the assigned section 37; 38 of the outer circumferential surface 33. Accordingly, the first and the second section 71; 72 of the bottom surface 70 are each aligned parallel to the assigned section 37; 38 of the outer circumferential surface 33. The depth 64 of the recess 61 is accordingly constant.

The production of the recess 61 is effected in two cuts, of which the direction of advance in each case is denoted by an arrow 92. The advance is effected from the centre of the recess 61 toward the semicircular-cylindrical end of the recess 61. The end mill 90 in this case is moved outside of the flange, to the level of the respectively first or second section 71; 72 of the ground surface 70 to be produced, and it is then moved only in the direction of advance 92, in order to mill the recess 61. With this course of cut, there is no risk of burrs at the recess 61, as the end mill 90 is moved only perpendicularly in relation to its axis of rotation 91. In particular, it does not execute any drilling movement in the direction of its axis of rotation 91 while cutting into the material of the flange 32.

The result is a recess having a single continuous perimeter 62, the perimeter 62 having a sharp bend only where the first and the second section 71; 72 of the bottom surface 70 are directly adjacent to each other.

Figure 3:
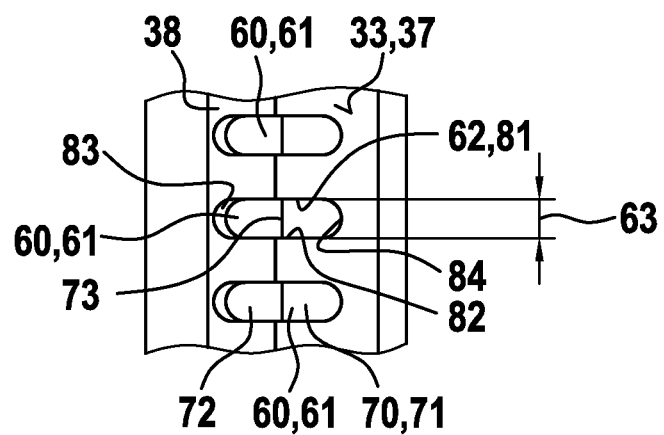
FIG. 3 a partial side view of the flange according to FIG. 2.

FIG. 3 shows a partial sectional view of the flange 32 according to FIG. 2. The direction of view in this case is perpendicular to the first axis of rotation, the outer circumferential surface 33 being shown in a developed representation.

The figure shows the elongate-hole type shape of the recesses 61, which are identical to each other, and which are arranged with a periodic distribution over the circumferential surface 33. The side wall 80 of the recess 61 has a first, a second, a third and a fourth section 81; 82; 83; 84. The first and the second section 81; 82 are each flat and parallel to each other, such that the recess 61 has a constant width 63. The third and the fourth section are each realized as semicircular cylinders, according to the shape of the end mill. Overall, the result is a side wall 80 that has no sharp bends or offsets over its entire circumference.

Visible on the bottom surface 70 of the recess 61 is the straight boundary line 73, at which the first and the second section 71; 72 of the bottom surface 70 are directly adjacent to each other at an angle other than zero.

REFERENCE NUMERALS 10 axial piston machine
11 sensor
20 housing
21 first housing part
22 second housing part
30 drive shaft
31 first axis of rotation
32 flange
33 outer circumferential surface
34 first rotary bearing
35 second rotary bearing
36 drive journal
37 first section of the outer circumferential surface
38 second section of the outer circumferential surface 50 cylinder barrel
51 second axis of rotation
52 piston
53 ball joint
54 domed control plate
55 centering piston
56 cylinder bore
60 counting perforation
61 recess
62 perimeter
63 width of a counting perforation
64 depth of a counting perforation
70 bottom surface
71 first section of the bottom surface
72 second section of the bottom surface
73 boundary line
80 side wall
81 first section
82 second section
83 third section
84 fourth section
90 end mill
91 axis of rotation of the end mill
92 direction of advance of the end mill

The invention claimed is:

1. An inclined-axis axial piston machine comprising:
a housing;
a drive shaft mounted in the housing so as to rotate about a first axis of rotation;
a cylinder barrel having a second axis of rotation with a position that is settable or fixed such that the second axis of rotation intersects the first axis of rotation at an angle other than zero, the drive shaft being connected to the cylinder barrel so as to rotationally drive the cylinder barrel;
a flange that is integral with the drive shaft;
a plurality of pistons arranged in the cylinder barrel in a linearly movable manner substantially along the second axis of rotation, each piston of the plurality of pistons being coupled to the flange via a ball joint;
a multiplicity of counting perforations arranged in a periodically distributed and continuous manner over an outer circumferential surface of the flange;
a sensor accommodated in the housing and arranged opposite the counting perforations such that rotation of the drive shaft causes a signal change at the sensor,
wherein each counting perforation is formed integrally from the flange as a recess, each recess having a single continuous perimeter and a side wall that extends uninterrupted over an entire circumference of the perimeter so as to form a continuous and partially curved side wall surface extending around the entire circumference of the perimeter.

2. The axial piston machine according to claim 1, wherein the multiplicity of counting perforations are identical to each other.

3. The axial piston machine according to claim 1, wherein the multiplicity of counting perforations are configured as elongate holes.

4. The axial piston machine according to claim 1, wherein the counting perforations have at least one of a constant width and a constant depth.

5. The axial piston machine according to claim 1, wherein the perimeter is formed as an edge.

6. The axial piston machine according to claim 1, wherein the perimeter is one of chamfered and rounded.

7. The axial piston machine according to claim 1, wherein a first section of the side wall and a second section of the side wall are parallel to one other and parallel to a plane that includes the first axis of rotation.

8. The axial piston machine according to claim 1, wherein the side wall surface includes a first flat section and a second flat section, the first and second flat sections being connected to one another by two at least partially curved sections.

9. An inclined-axis axial piston machine comprising:
a housing;
a drive shaft mounted in the housing so as to rotate about a first axis of rotation;
a cylinder barrel having a second axis of rotation with a position that is settable or fixed such that the second axis of rotation intersects the first axis of rotation at an angle other than zero, the drive shaft being connected to the cylinder barrel so as to rotationally drive the cylinder barrel;
a flange that is integral with the drive shaft;
a plurality of pistons arranged in the cylinder barrel in a linearly movable manner substantially along the second axis of rotation, each piston of the plurality of pistons being coupled to the flange via a ball joint;
a multiplicity of counting perforations arranged in a periodically distributed and continuous manner over an outer circumferential surface of the flange;
a sensor accommodated in the housing and arranged opposite the counting perforations such that rotation of the drive shaft causes a signal change at the sensor,
wherein each counting perforation is formed integrally from the flange as a recess, each recess having a single continuous perimeter and a side wall that extends uninterrupted around an entire circumference of the perimeter so as to form a smooth and continuous side wall surface extending around the entire circumference of the perimeter, and
wherein the recesses are defined by a bottom surface that has flat sections, the flat sections being arranged in an inclined manner relative to each other.

10. The axial piston machine according to claim 9, wherein the flat sections of the bottom surface include two directly adjacent flat sections that are inclined relative to one other at an angle other than zero.

11. The axial piston machine according to claim 9, wherein the flat sections of the bottom surface are inclined in relation to each other such that the bottom surface defines an overall convex floor surface.

12. The axial piston machine according to claim 9, wherein a section of the outer circumferential surface that is circular-cylindrical or circular-conical with respect to the first axis of rotation is assigned to each respective flat section, each respective flat section of the bottom surface being arranged parallel to the section of the outer circumferential surface assigned to the respective flat section.

13. An inclined-axis axial piston machine comprising:
a housing;
a drive shaft mounted in the housing so as to rotate about a first axis of rotation;
a cylinder barrel having a second axis of rotation with a position that is settable or fixed such that the second axis of rotation intersects the first axis of rotation at an angle other than zero, the drive shaft being connected to the cylinder barrel so as to rotationally drive the cylinder barrel;
a flange that is integral with the drive shaft;
a plurality of pistons arranged in the cylinder barrel in a linearly movable manner substantially along the second axis of rotation, each piston of the plurality of pistons being coupled to the flange via a ball joint;
a multiplicity of counting perforations arranged in a periodically distributed and continuous manner over an outer circumferential surface of the flange;
a sensor accommodated in the housing and arranged opposite the counting perforations such that rotation of the drive shaft causes a signal change at the sensor,
wherein each counting perforation is formed integrally from the flange as a recess, each recess having a single continuous perimeter and a side wall that extends uninterrupted around an entire circumference of the perimeter so as to form a smooth and continuous side wall surface extending around the entire circumference of the perimeter,
wherein a first section of the side wall and a second section of the side wall are parallel to one other and parallel to a plane that includes the first axis of rotation, and
wherein a third section of the side wall and a fourth section of the side wall are each formed as half of a circular cylinder having a central axis of that intersects the first axis of rotation, the first, second, third and fourth section of the side wall arranged such that, taken together, the first, second, third, and fourth sections form the side wall as a continuous wall.

* * * * *